(12) United States Patent
Choudhery et al.

(10) Patent No.: US 9,758,665 B2
(45) Date of Patent: Sep. 12, 2017

(54) AQUEOUS POLYMER DISPERSIONS

(75) Inventors: Riaz Ahmad Choudhery, Solihull (GB); David John Dyer, Evesham (GB); Brian David Milligan, Henley-in-Arden (GB); Stuart Douglas Smith, Walsall (GB)

(73) Assignee: IMPERIAL CHEMICAL INDUSTRIES LIMITED, London (GB)

( * ) Notice: Subject to any disclaimer, the term of this patent is extended or adjusted under 35 U.S.C. 154(b) by 805 days.

(21) Appl. No.: 11/572,065

(22) PCT Filed: Dec. 16, 2005

(86) PCT No.: PCT/EP2005/013824
§ 371 (c)(1),
(2), (4) Date: Nov. 9, 2007

(87) PCT Pub. No.: WO2006/066905
PCT Pub. Date: Jun. 29, 2006

(65) Prior Publication Data
US 2008/0114124 A1 May 15, 2008

(30) Foreign Application Priority Data

Dec. 22, 2004 (GB) .................................. 0428104.4
Aug. 3, 2005 (GB) .................................. 0515985.0

(51) Int. Cl.
*C08L 51/08* (2006.01)
*C08F 283/10* (2006.01)
*C09D 151/08* (2006.01)

(52) U.S. Cl.
CPC ............ *C08L 51/08* (2013.01); *C08F 283/10* (2013.01); *C09D 151/08* (2013.01)

(58) Field of Classification Search
CPC ... C08L 2666/24; C08L 51/08; C09D 151/08; C08F 283/10
See application file for complete search history.

(56) References Cited

U.S. PATENT DOCUMENTS

| | | | | |
|---|---|---|---|---|
| 3,492,252 A | * | 1/1970 | Euchner et al. | 523/412 |
| 4,522,961 A | * | 6/1985 | Martino et al. | 523/407 |
| 4,997,865 A | | 3/1991 | Scherping et al. | |
| 5,053,455 A | * | 10/1991 | Kroggel et al. | 525/58 |
| 5,068,266 A | | 11/1991 | Kojima et al. | |
| 5,252,669 A | * | 10/1993 | Maska et al. | 525/112 |
| 5,464,885 A | * | 11/1995 | Craun | 523/423 |
| 5,525,669 A | * | 6/1996 | Schafheutle et al. | 524/507 |
| 5,543,445 A | * | 8/1996 | Nield et al. | 523/406 |
| 5,763,507 A | * | 6/1998 | Moriga et al. | 523/424 |
| 6,194,515 B1 | * | 2/2001 | Shinohara et al. | 525/92 A |
| 6,306,934 B1 | * | 10/2001 | Bode et al. | 523/412 |
| 6,893,678 B2 | * | 5/2005 | Hirose et al. | 427/239 |
| 7,005,474 B2 | * | 2/2006 | Liu et al. | 524/800 |
| 2003/0004296 A1 | * | 1/2003 | Koto et al. | 528/93 |
| 2005/0287302 A1 | * | 12/2005 | Awad et al. | 427/386 |
| 2007/0283852 A1 | * | 12/2007 | Saika et al. | 106/287.24 |
| 2010/0062199 A1 | * | 3/2010 | Choudhery et al. | 428/35.7 |

FOREIGN PATENT DOCUMENTS

| | | | |
|---|---|---|---|
| EP | 0 629 643 | 12/1994 | |
| JP | 10-324841 | 12/1998 | |
| JP | H10-324841 | * 12/1998 | |
| JP | 11343456 A | * 12/1999 | .......... C09D 163/00 |
| JP | 2005-336426 | * 12/2005 | |
| WO | 97/45476 | 12/1997 | |
| WO | 01/64774 | 9/2001 | |
| WO | WO 2009/003937 | * 1/2009 | |

OTHER PUBLICATIONS

English machine Translation of JP 10-324841. Obtained from AIPN/JPO website.*
Shimizu et al. English machine translation of JP 11-343456. Obtained from AIPN/JPO website on Sep. 27, 2011.*
"Phenoxy Resins". Obtained from http://composite.about.com/library/glossary/p/bldef-p3915.htm on Mar. 22, 2014. No Author, No Date.*
Dow "Epoxy Resins Product Overview". Obtained from http://msdssearch.dow.com/PublishedLiteratureDOWCOM/dh_01f5/0901b803801f57b6.pdf?filepath=/296-01684.pdf &fromPage=GetDoc on Mar. 22, 2014. No Author, No Date.*
International Search Report for International Application No. PCT/EP2005/013824, dated Sep. 8, 2006, 5 pages.
European Search Report for EP 05077909.9, dated Sep. 12, 2006, 7 pages.

(Continued)

Primary Examiner — Michael A Salvitti
(74) Attorney, Agent, or Firm — McDonnell Boehnen Hulbert & Berghoff LLP

(57) ABSTRACT

A process for producing an aqueous dispersion of at least two preformed polymers each at least partially modified by grafted addition polymers produced in a solution of the polymers, comprising the steps of i) providing a solution in organic carrier liquid of a first preformed polymer, consisting of diepoxy resin, and at least one other preformed polymer excluding polyesters ii) mixing the solution containing the polymers with ethylenically unsaturated monomers, said monomers comprising an effective amount of copolymerizable dispersing moiety iii) providing an effective amount of a grafting polymerization initiator iv) allowing or causing the monomers to polymerize and graft to at least some of the preformed polymers to form a solution of modified polymers v) optionally adding crosslinking agent to solution iv) vi) dispersing the solution of modified polymers, and optionally crosslinking agent, in aqueous medium to form a stable dispersion of particles.

41 Claims, No Drawings

(56) References Cited

OTHER PUBLICATIONS

AkzoNobel, Initiators and Reactor Additives for Thermoplastics, AkzoNobel Functional Chemicals, 2010.

* cited by examiner

AQUEOUS POLYMER DISPERSIONS

CROSS-REFERENCE TO RELATED APPLICATION

This application is the national phase under 35 U.S.C. §371 of PCT International Application No. PCT/EP/2005/013824 having an international filing date of Dec. 16, 2005 entitled "AQUEOUS POLYMER DISPERSIONS", which designated the United States of America, and was published in the English language as International Publication No. WO 2006/066905, which claims the benefit of priority to both Great British Application No. 0428104.4 filed on Dec. 22, 2004 and Great British Application No. 0515985.0 filed on Aug. 3, 2005. This application also claims the benefit of U.S. provisional patent application Ser. No. 60/726,311 entitled "AQUEOUS POLYMER DISPERSIONS" filed Oct. 13, 2005. The disclosure of all of these applications is hereby incorporated in their entirety by reference.

The present invention relates to a process for producing aqueous polymer dispersions comprising preformed polymers modified by grafted addition polymers, in particular to diepoxy resins and polyvinyl butyral resins modified with grafted addition polymers.

Metal food and drink containers, often referred to as cans, are usually coated on the interior surfaces to prevent reaction between the contents and the metal from which the can is formed. Such reaction leads both to unwanted deterioration of the can and also potentially damaging effects on the contents, particularly in terms of changes in quality and taste. Without an interior coating, most cans of food or drink would not remain usable for very long. The coating is often applied to the flat metal by roller coating before the can is formed and then dried and/or cured in a stoving operation. Typical oven temperatures used are about 200° C. for 6 to 12 minutes. The can is then formed from the flat metal by a drawing process before being filled with food or drink and finally sealed with an "end", it also being coated. Alternatively and additionally, the coating may be spray applied to the formed can and stoved.

The coatings are required to have very good flexibility, adhesion, corrosion resistance, resistance to boiling water and sterilisation resistance. Furthermore, the coatings must be smooth, as rough uneven coatings cause carbonated beverages contained therein to lose their carbon dioxide resulting in 'flat', non-fizzy drinks.

Flexibility and adhesion are essential if the coating is to remain intact during the can formation process when the coated flat metal sheet is drawn into the form of the can.

When the cans are filled with food, the contents are usually subsequently sterilised by heating the sealed cans to temperatures of around 130° C. for 1 to 2 hours (depending on the nature of the food). The coating remains in direct contact with the contents of the can for a considerable period of time which could be many years. During sterilisation and subsequent storage, the coating is required to maintain its integrity so as to prevent corrosion of the metal can and to prevent migration of, for example iron, into and causing discoloration of, the can contents, especially if the can exterior has been damaged. Additionally, the coating must not impair the contents by releasing any other unwanted material or by altering the flavour or appearance.

The resistance properties referred to above impact not only on the shelf life of the product but also on public health and safety. Thus, there are particularly stringent and specific requirements of coating compositions for can interiors which are different from those for other coatings.

Epoxy resins of the bis phenol A type, crosslinked with a variety of crosslinkers such as phenol-formaldehyde resins, are commonly used to coat the interiors of cans. Improvements have been made by modifying such epoxy resins with addition polymers, especially addition polymers containing acid functional moieties such as acrylic acid or methacrylic acid. Typically, the epoxide is dissolved in a solvent to which the monomers of the addition polymer are added. A grafting initiator is added and the monomers polymerised. In this way the epoxy resin is modified with grafted addition polymer containing acid moieties. Neutralisation of the acid moieties allows the modified epoxide to be dispersed in water.

However, although such coatings have low solvent content there is nevertheless a need to improve their flexibility and corrosion performance.

Laid open Japan patent application JP-11 343456 describes a variation to the approach described above. This involves the addition of an unmodified resin, such as polyester or polyvinyl butyral, to the known epoxide-addition polymer aqueous dispersion described above and crosslinking with a phenol-formaldehyde crosslinker. However, this approach still produces inadequate film performance. In particular, rough, hazy coatings are produced having poor corrosion resistance. JP-53 146733 discloses vinyl monomers polymerised in organic solvent containing PVB. The resulting resin is used as the film former in various solvent-borne non-can coating applications. EP 0 629 643 discloses the use of modified unsaturated polyesters.

In a first aspect of the invention there is provided a process for producing an aqueous dispersion of at least two preformed polymers each at least partially modified by grafted addition polymer produced in a solution of the polymers comprising the steps of
i) providing a solution in organic carrier liquid of a first preformed polymer, consisting of diepoxy resin, and at least one other preformed polymer excluding polyesters
ii) combining the solution containing the polymers with ethylenically unsaturated monomers, said monomers comprising an effective amount of copolymerisable dispersing moiety
iii) providing an effective amount of a grafting polymerisation initiator
iv) allowing or causing the monomers to polymerise and graft to at least some of the preformed polymers to form a solution of modified polymers
v) optionally adding crosslinking agent to solution iv)
vi) dispersing the solution of modified polymers, and optionally crosslinking agent, in aqueous medium to form a stable dispersion of particles.

In a second aspect of the invention there is provided an aqueous dispersion, comprising polymer particles and optionally crosslinking agent, said particles comprising a preformed diepoxy resin and at least one other preformed polymer excluding polyester, where the diepoxy resin and the other polymer are at least partially modified with grafted addition polymer comprising an effective amount of copolymerisable dispersing moiety.

In a third aspect of the invention there is provided a coating composition comprising the aqueous dispersion.

In a fourth aspect of the invention there is provided a metal container coated with the coating composition and optionally stoved at a temperature sufficient to cause the coating to crosslink.

The process produces a dispersion of polymer particles wherein each particle contains an intimate mixture of all the polymer species. In this way a more homogeneous coating is formed. This does not occur when a dispersion of modified diepoxy polymer is simply mixed with a dispersion of modified PVB polymer as the polymers are in different particles and thus not in such intimate contact. This results in regions of the coating with differing compositions. Such inhomogeneity results in poor coating properties.

By diepoxy is meant that, on average, the epoxy resin has two epoxy groups per molecule. Preferably the epoxy equivalent weight (EEW) is from 500 to 10000, more preferably from 750 to 6000 and most preferably from 2000 to 4500. The epoxy equivalent weight is an indication of the number of epoxy groups per polymer chain. For example, an epoxy resin of EEW 750, has one epoxy moiety for every 750 Daltons molecular weight.

Suitable examples of diepoxy resins are commercially available and include those derived from bis phenol A diglycidyl ether (BADGE) such as Epikote 1004 and Araldite 6084, both being type 4 diepoxy resins; Epikote 1007 is a type 7 and DER 669-20 is a type 9. Alternatively and more conveniently, the preformed diepoxy resin of required molecular weight and EEW may be manufactured in-situ by reacting BADGE and diphenol propane (also known as bis phenol A) in a step prior to polymerising the ethylenically unsaturated monomers. Thus, the term 'preformed polymer' refers to the polymeric material present immediately prior to the polymerization step. Phosphated diepoxies are not suitable as they introduce water sensitivity to the derived coatings, although small amounts, for example less than 5% by weight of the polymer solids, are acceptable in some none critical applications.

The word 'type' in the above context is generally understood by those skilled in the art to signify the average number of repeating units in the resin backbone. As such, as the type number increases, the molecular weight rises and the EEW for a given number of epoxy moieties also rises. The diepoxy resins derived from BADGE are preferred as these produce the best corrosion resistance when coatings derived from them are used on the interiors of metal containers.

By grafted is meant that a chemical bond, probably of the covalent type, is formed between the preformed polymers and the addition polymer. Though not wishing to be bound by this it is thought that each modified polymer has a comb-like structure, with the preformed polymer forming the backbone and the addition polymer depending from it, probably from a carbon atom that formerly had an abstractable hydrogen atom. Easily abstractable hydrogen atoms are those attached to secondary or tertiary carbon atoms.

A polymerisation initiator is used to polymerise the addition monomers. The initiator must be of the grafting type. By this is meant that it can abstract a hydrogen atom from the preformed polymer backbone. Suitable examples of such initiators include the peroxide type such as benzoyl peroxide, di(tertiary butyl)peroxide, tertiary butyl peroxy-2-ethyl hexanoate and tertiary butyl peroxybenzoate. Most preferred is benzoyl peroxide. For effective grafting of the addition polymer to the preformed polymer, the amount of initiator should preferably be from 1 to 10% calculated on the total weight of ethylenically unsaturated monomers used, more preferably from 2 to 9% and most preferably from 3 to 8%

Polymerisation is preferably effected by raising the temperature above the decomposition temperature of the initiator. Careful selection of the organic carrier liquid allows the polymerisation step to be run at the reflux temperature of the polymerising mixture, making for easier temperature control. Alternatively, the polymerisation may be performed off-reflux and the temperature controlled by other means. Preferably the polymerisation is carried out at from 50 to 200° C., more preferably from 100 to 200° C. and most preferably from 110 to 140° C.

The at least one other preformed polymer must be selected from those polymers having abstractable hydrogen atoms whereby in the presence of the polymerisation initiator and the ethylenically unsaturated monomers, a preformed polymer-addition polymer graft copolymer is formed.

Suitable examples of such preformed polymers include polyvinyl acetals such as polyvinyl butyral and polyvinyl formal; polyvinyl chloride; ethylene and its copolymers including ethylene vinyl acetate, ethylene-methyl methacrylate, ethylene-butyl acrylate, ethylene-isobutyl acrylate, ethylene-carbon monoxide, ethylene-maleic anhydride, ethylene-acrylic acid, ethylene-vinyl alcohol; propylene and its copolymers including propylene-maleic anhydride, propylene-acrylic acid and ethylene-propylene copolymers; cellulose and its copolymers including carboxy methyl cellulose, cellulose acetate, ethyl hydroxy ethyl cellulose, hydroxy propyl methyl cellulose; butadiene-acrylonitrile, butadiene-styrene; polyisobutylene, styrene-isobutylene; siloxanes including methyl hydrogen polysiloxane; polyamides; polyurethanes; polyols including polyethylene oxide, polypropylene oxide polybutylene oxide.

Polyesters, by which is meant polymers with ester linkages in the backbone, are not useful preformed polymers as they are insufficiently stable to hydrolysis in the aqueous systems of the invention. This results in loss of adhesion following the water boil test, described in more detail below. Furthermore, the hydrolysis products of the polyester also taint the flavour of the can contents.

The preferred weight ratio of the preformed polymer to the diepoxy resin is from 6:94 to 30:70, more preferred is from 7:93 to 20:80 and most preferred is from 6:94 to 15:85. The actual ratio used will depend on the end use; for example, where a very flexible coating is required more of the preformed polymer is used; alternatively where greater chemical resistance is required proportionally more of the diepoxy resin is used.

Preferred polymers include the polyacetals; ethylene-vinyl alcohol, ethylene-butyl acrylate and ethylene-isobutyl acrylate; propylene maleic anhydride; butadiene-styrene; polyisobutylene, styrene-isobutylene; polysiloxane, polyurethanes, polyols.

More preferred are the polyacetals. Such polymers are made by saponifying polyvinyl acetate to polyvinyl alcohol and then reacting this with an aldehyde in the presence of acid catalysts in water. Polyvinyl butyral polymers are most preferred in particular of weight average molecular weight (Mw) greater than 35,000 Daltons. Below this, the resistance to boiling water is inadequate for use in can interiors as measured by the water boil rating. More preferably, the molecular weight of the PVB is from 35,000 to 350,000 Daltons and yet more preferably from 50,000 to 100,000. These also produce the excellent corrosion resistance in the coatings. The pendant hydroxyl groups of PVB are especially desirable as they provide useful sites for crosslinking. It is thought that they are particularly beneficial as they are distributed along the polymer chain, rather than present only at the ends.

By aqueous medium is meant that at least 50% by weight of the dispersing medium is water with the remainder being organic solvent, preferably water compatible solvent and even more preferably water soluble solvent. Advantageously, the amount of organic solvent is kept to a minimum, preferably zero. Although very low amounts are preferred, because of reduced emissions to the atmosphere, a minimum amount is normally required to ensure adequate sprayability of the coating and wetting of the metal substrate. A process that can produce very low or zero solvent levels is even more preferred as it gives greater scope to the coating formulator to adjust the solvent mixture in order to optimise the spraying properties of the coating and the wetting characteristics.

The grafted addition copolymer can comprise any polymer (including copolymers) of copolymerisable ethylenically unsaturated monomers. Examples of suitable ethylenically unsaturated monomers include (meth)acrylic acid esters, amides, and nitriles, vinyl monomers and vinyl esters. Preferably, the addition polymer is derived from (meth) acrylic acid ester monomers. The amount of addition polymer required is typically from 5 to 80% by weight based on the total preformed polymer, preferably from 10 to 70%, more preferably from 10 to 60% and most preferably from 10 to 40%.

Using the nomenclature of (meth)acrylate to represent both acrylate and methacrylate, examples of suitable acrylic acid esters and methacrylic acid esters are alkyl esters, preferably methyl(meth)acrylate, propyl (meth)acrylate, butyl(meth)acrylate, 2-ethyl hexyl(meth)acrylate and alkoxy poly(oxyethylene) (meth)acrylate. Hydroxy functional monomers such as hydroxy ethyl(meth)acrylate and hydroxy isopropyl(meth)acrylate also may be included, providing sites capable of reacting with crosslinker. Examples of suitable vinyl monomers include styrene and alpha methyl styrene, vinyl propionate, vinyl butyrate, vinyl acetate and vinyl versatate. Preferably the addition copolymer is derived from the esters of acrylic acid, methacrylic acid and optionally styrene and/or its derivatives.

The ethylenically unsaturated monomers should also contain effective amounts of copolymerisable dispersing moiety. By copolymerisable is meant that the dispersing moiety is able to copolymerise with the ethylenically unsaturated monomers hereinbefore described. The dispersing moieties may be ionic or non-ionic. If ionic they may be anionic or cationic. Preferably they are ionic and more preferably they are anionic. Suitable examples of non-ionic dispersing moieties include the polyethylene oxide methacrylates such as (PEG), methacrylate where PEG denotes polyethylene glycol and n molecular weight; n is preferably from 350 to 2000 Daltons.

By effective amount is meant the amount of dispersing moiety that produces a dispersion of required particle size and adequate storage stability. The effective amount will vary according to the nature of the moiety itself and of the preformed polymer, in particular its molecular weight and hydrophobicity, and the solubility characteristics of the aqueous medium. Nevertheless, those skilled in the art can determine this by routine experimentation. Preferred amounts are from 5 to 75% by weight of the addition polymer, preferably from 20 to 70% and most preferably from 30 to 60%.

Suitable examples of ionic dispersing moieties include (meth)acrylic acid. The amounts required will vary according to the hydrophobicity of the preformed polymers themselves and their molecular weight. The more hydrophobic and the higher in molecular weight they are the more dispersing moiety will be required to form the dispersion in aqueous medium. When (meth)acrylic acid is used the acid value of the nv addition polymer of the dispersion is preferably from 100 to 650 mg KOH/g of nv polymer, more preferably from 150 to 550 KOH/g and most preferably from 250 to 450 KOH/g.

The ionic dispersing moieties, whether cationic or anionic, are preferably at least partially neutralised. Suitable neutralising agents for (meth)acrylic acid include the alkali metal hydroxides and neutralising bases. Suitable examples include sodium hydroxide and potassium hydroxide, ammonia and amines. Neutralising bases such as ammonia and amines are preferred as these produce dried solid coatings of improved water resistance. More preferably dimethyl ethanolamine is used.

The coating composition is preferably crosslinkable. Advantageously, this may be achieved by adding the crosslinking agent to the cooled modified polymer solution iv) immediately prior to the dispersion step v). The temperature at which the crosslinking agent is added is chosen such that the crosslinking capability is substantially preserved. In other words, the temperature is below that at which crosslinking takes place. This has the further advantage that each particle of the dispersion comprises an intimate mixture of the modified polymers and crosslinking agent. This ensures that the stoved coating has substantially uniform crosslink density thus avoiding regions of brittle, high crosslink density and soft, un-crosslinked regions; both such regions produce poor performance in use in the more demanding applications of food containers. Alternatively, the crosslinking agent may be added after the dispersion step, typically during the coating making process. The performance of such coatings is generally acceptable in applications where sterilization of the can contents is not required.

The preferred crosslinking agents include the amino or aminoplast resins and the phenolformaldehyde or phenolplast resins. Suitable aminoplast resins include the melamine-formaldehyde, benzoguanamine-formaldehyde and urea-formaldehyde types. The hexamethoxy methyl melamine types are convenient as they are water soluble and may be added to the preformed polymer dispersion where this is desirable. Suitable phenolplast resins include Santolink EP560 from Monsanto.

The ratio of crosslinking agent to total modified polymer calculated on a non vol weight basis can vary widely. Normally, it is from 1:99 to 50:50, preferably from 2:98 to 30:70, more preferably from 3:97 to 40:60, even more preferably from 3:97 to 30:70 and most preferably from 3:97 to 20:80.

The invention is illustrated by the following examples. All amounts are parts by weight (pbw).

The following ingredients were used in the examples

DER 331 Liquid diepoxy available from Dow Chemicals

Pioloform BM 18 Polyvinyl butyral resin (PVB) of average molecular weight 70,000-90,000 Daltons available from Wacker-Chemie Munich, Germany.

Pioloform BN 18 PVB of average molecular weight 30,000-35,000 Daltons.

Pioloform BS 18 PVB of average molecular weight 250,000-350,000 Daltons.

Santolink EB 560 Phenol-Formaldehyde crosslinking agent (81% wt solids) available from Cytec Surface Specialties.

EXAMPLE 1

Polyvinyl butyral preformed polymer was added prior to polymerisation. The final aqueous dispersion is thought to comprise a polymer composition of diepoxy-acrylic addition polymer graft, PVB-acrylic addition polymer graft, diepoxy resin, PVB and acrylic addition polymer.

The ratio of PVB:diepoxy:acrylic:X-linker is 6.0:70.4:19.1:4.5

| Ingredients | pbw |
|---|---|
| 1. DER 331 | 143.90 |
| 2. Diphenol Propane | 79.41 |
| 3. Butyl Oxitol | 50.45 |
| 4. Phosphonium Acetate | 0.17 |
| 5. Distillate | −7.14 |
| 6. Deionised Water | 0.81 |
| 7. Butyl Oxitol | 23.90 |
| 8. Butanol | 100.65 |
| 9. Pioloform BM18 | 19.03 |
| 10. Methacrylic Acid | 24.67 |
| 11. Styrene | 31.81 |
| 12. Ethyl Acrylate | 0.57 |
| 13. Benzoyl Peroxide (75%) | 4.76 |
| 14. Butyl Oxitol | 12.51 |
| 15. Butanol | 5.65 |
| 16. Santolink EB 560 | 17.52 |
| 17. Dimethyl Ethanolamine | 14.07 |
| 18. Deionised Water | 522.25 |
| Total | 1044.99 |

Procedure:

1) In-Situ Preparation of Chain Extended Diepoxy Resin.

A round bottom flask was fitted with a stirrer, addition ports and arranged with vacuum distillation facility.

Charge ingredients 1, 2 and 3 and heat to 50° C. Add ingredient 4 and apply a vacuum (better than 75 mb). Heat to distillation and remove the stated quantity of distillate (5). Break vacuum with nitrogen.

Set for direct reflux and heat to 140° C. Allow to exotherm and hold at 175-180° C. Sample for a reduced viscosity of 25-32.5 poise as measured at 25° C. and 40% nv in butyl oxitol. When at viscosity add deionised water (6) and hold at reflux for 30 minutes. Cool and thin with Butyl oxitol (7) and then butanol (8). This is the preformed diepoxy resin.

2) Add Ingredient 9 and Maintain Temperature Until Dissolved.

3) Polymerisation

Heat to 115-118° C. and add a premix of ingredients 10-14 over 2.25 hours. Rinse in with butanol (15) and hold for a further 30 minutes after which polymerization is complete.

4) Crosslinking Agent Addition

Cool to 100° C. and add the phenol-formaldehyde crosslinking resin (16) and hold at 90-100° C. for 15 minutes.

5) Dispersion

Add dimethylethanolamine (17) and hold at 90-100° C. for 30 minutes. Heat off; add water (18) over 1 hour whilst stirring to form the dispersion. Non-volatile content by weight should be 29-31% (measured at 200° C./10 minutes)

Material can be adjusted to desired application solids/viscosity by further additions of deionised water and dimethyl ethanolamine as required.

COMPARATIVE EXAMPLE A

The following ingredients were used to make an aqueous dispersion of a diepoxide resin modified by grafted addition polymer (hereafter referred to as epoxide-addition polymer graft). It is thought that the polymer composition of the dispersion is a mixture of epoxide-addition polymer, epoxide resin and addition polymer result.

| Ingredients | pbw |
|---|---|
| 1. DER 331 | 143.90 |
| 2. Diphenol Propane | 79.41 |
| 3. Butyl Oxitol | 50.45 |
| 4. Phosphonium Acetate | 0.17 |
| 5. Distillate | −7.14 |
| 6. Deionised Water | 0.81 |
| 7. Butyl Oxitol | 18.61 |
| 8. Butanol | 93.75 |
| 9. Methacrylic Acid | 24.67 |
| 10. Styrene | 31.81 |
| 11. Ethyl Acrylate | 0.57 |
| 12. Benzoyl Peroxide (75 wt% in carrier liquid) | 4.76 |
| 13. Butyl Oxitol | 12.51 |
| 14. Butanol | 5.65 |
| 15. Santolink EB 560 | 17.52 |
| 16. Dimethyl Ethanolamine | 14.07 |
| 17. Deionised Water | 490.48 |
| Total | 982.00 |

The procedure used was as follows:

The apparatus was set up as for Example 1.

1) In-Situ Preparation of Chain Extended Diepoxy Resin.

Charge ingredients 1, 2 and 3 and heat to 50° C. Add ingredient 4 and apply a vacuum of greater than 75 millibar (mb). Heat to distillation and remove the stated quantity of distillate (5). Break vacuum with nitrogen.

Set for direct reflux and heat to 140° C. Allow to exotherm and hold at 175-180° C. Sample for a reduced viscosity of 25-32.5 poise as measured at 25° C. and 40% nv in butyl oxitol. When at viscosity add deionised water (6) and hold at reflux for 30 minutes. Cool and thin with Butyl oxitol (7) and then butanol (8).

2) Polymerisation

Cool to 115-118° C. and add a premix of items 9-13 over 2.25 hours. Rinse in with butanol (14) and hold for a further 30 minutes.

3) Crosslinking Agent Addition

Cool to 100° C. and add the phenol-formaldehyde resin (15) and hold at 90-100° C. for 15 minutes.

4) Dispersion

Add dimethylethanolamine (16) and hold at 90-100° C. for 30 minutes.

Remove heat, add water (17) over 1 hour.

nv content by weight should be 29-31%.

The aqueous dispersion may be adjusted to desired application solids/viscosity by further additions of deionised water and dimethyl ethanolamine.

This produces an aqueous dispersion comprising a mixture of polymeric species thought to be epoxide-addition polymer graft, epoxide resin and addition polymer.

COMPARATIVE EXAMPLE B

In a variation of the above, polyvinyl butyral was added after the polymerisation step and prior to the emulsification. This resulted in an aqueous dispersion where the polymer composition is thought to comprise epoxide-addition polymer graft, addition polymer, epoxy resin and polyvinyl butyral.

Procedure:

| Ingredients | pbw |
|---|---|
| 1. DER 331 | 143.90 |
| 2. Diphenol Propane | 79.41 |

-continued

| Ingredients | pbw |
|---|---|
| 3. Butyl Oxitol | 50.45 |
| 4. Phosphonium Acetate | 0.17 |
| 5. Distillate | −7.14 |
| 6. Deionised Water | 0.81 |
| 7. Butyl Oxitol | 18.61 |
| 8. Butanol | 93.75 |
| 9. Methacrylic Acid | 24.67 |
| 10. Styrene | 31.81 |
| 11. Ethyl Acrylate | 0.57 |
| 12. Benzoyl Peroxide (75%) | 4.76 |
| 13. Butyl Oxitol | 12.51 |
| 14. Butanol | 5.65 |
| 15 Butyl oxitol | 5.29 |
| 16. Butanol | 6.90 |
| 17. Pioloform BM18 | 19.03 |
| 18. Santolink EB 560 | 17.52 |
| 19. Dimethyl Ethanolamine | 14.07 |
| 20. Deionised Water | 522.25 |
| Total | 1044.99 |

Procedure:

The apparatus was set up as for Example 1.

1) In-Situ Preparation of Chain Extended Diepoxy Resin.

Charge ingredients 1, 2 and 3 and heat to 50° C. Add ingredient 4 and apply a vacuum (better than 75 mb). Heat to distillation and remove the stated quantity of distillate (5). Break vacuum with nitrogen.

Set for direct reflux and heat to 140° C. Allow to exotherm and hold at 175-180° C. Sample for a reduced viscosity of 25-32.5 poise as measured at 25° C. and 40% nv in butyl oxitol. When at viscosity add deionised water (6) and hold at reflux for 30 minutes. Cool and thin with Butyl oxitol (7) and then butanol (8).

2) Polymerisation

Cool to 115-118° C. and add a premix of items 9-13 over 2.25 hours.

Rinse in with butanol (14) and hold for a further 30 minutes.

3) Add Ingredients 15 and 16 Followed by Item 17. Hold for Solution.

4) Crosslinking Agent Addition

Cool to 100° C. and add the phenol-formaldehyde resin (18) and hold at 90-100° C. for 15 minutes.

5) Dispersion

Add dimethylethanolamine (19) and hold at 90-100° C. for 30 minutes.

Remove heat, add water (20) over 1 hour.

nv should be 29-31%

The dispersion may be adjusted to desired application solids/viscosity by further additions of deionised water and dimethyl ethanolamine.

Intermediate C1

Preparation of an Aqueous Dispersion of PVB-Addition Polymer Graft

Preparation of PVB Acrylate Dispersion

| | pbw |
|---|---|
| 1. Butyl Oxitol | 48.0 |
| 2. Butanol | 84.8 |
| 3. Pioloform BM18 | 168.0 |
| 4. Methacrylic Acid | 23.9 |
| 5. Styrene | 44.0 |
| 6. Ethyl Acrylate | 0.6 |
| 7. Benzoyl Peroxide (75%) | 4.6 |
| 8. Butyl Oxitol | 17.6 |
| 9. Butanol | 9.0 |
| 10. Dimethyl Ethanolamine | 24.7 |
| 11. Deionised Water | 574.8 |
| Total | 1000.0 |

Procedure;

To 3 L flask (fitted with a nitrogen inlet, mechanical stirrer, thermometer probe, and reflux condenser) items 1-3 are charged. The mixture is heated to 110-115° C. and held at this temperature range until all of the item 3 has dissolved. Thereafter items 4-7 are charged slowly over a two hour period and after this addition the reactor is further held for 1.5 hours at 110-115° C. The reactor content is cooled to 90-95° C. and items 8-10 are charged.

Item 11 is charged under high shear over 1 hour period.

The resulting product is cooled to room temperature to yield a stable aqueous dispersion with solids contents between 22-24% (measured at 200° C./10 mins)

It is thought that this results in a dispersion where the polymer components are PVB-addition polymer graft, PVB and addition polymer.

COMPARATIVE EXAMPLE C

Preparation of a blend of an aqueous dispersion containing PVB-addition polymer graft and epoxide-addition polymer graft.

| Ingredients | |
|---|---|
| 1. Aqueous dispersion of Comparative Example A | 741.6 |
| 2. Deionised water | 169.1 |
| 3. Aqueous Dispersion of PVB-addition polymer graft from Intermediate C1 | 88.5 |
| 4. Dimethyl Ethanolamine | 0.8 |
| | 1000.0 |

Procedure:

Charge ingredient 1 and stir.
Add ingredient 2 followed by 3.
Adjust to viscosity with ingredient 4
nv=23-24%

COMPARATIVE EXAMPLE D

Intermediate D1

Preparation of an Unsaturated Polyester for Use as Preformed Polymer.

Set round bottomed flask for fractional distillation and pass nitrogen through flask. Charge 1101.8 g of butyl ethyl propane diol, 446.7 g of isophthalic acid, 304.2 g of 1.4 cyclohexane dicarboxylic and 1.65 g of butyl stannoic acid and raise temperature until distillation begins. Remove distillate and heat to 220° C., maintaining that temperature until the distillate is clear and the acid value of the resin is less than 10 mg KOH/g. Cool to 180° C. and add 164.5 g of maleic anhydride. Reheat to distillation temperature and maintain this temperature for 1 hour, removing any distillate produced. Change to Dean and Stark reflux and add 16.4 g of xylol to maintain a good reflux. Sample for acid value and when contents reach 5-10 mg KOH/g, then cool. Add 352.7 g of butyl oxitol and 352.7 of butanol.

The polyester has an acid value of 5 to 10 mg KOH/g, solids content of 70-71% by weight and a bubble tube viscosity of 20-25 poise measured at 25° C.

COMPARATIVE EXAMPLE D

The procedure according to example 1 was followed except that the PVB was replaced by the polyester, D1 and the ratio of polyester:diepoxy:acrylic:X-linker was 9.1:68.1:18.5:4.3

The final aqueous dispersion is thought to comprise a polymer composition of diepoxy-acrylic addition polymer graft, polyester-acrylic addition polymer graft, diepoxy resin, polyester and acrylic addition polymer.

The crosslinkable coatings of Example 1 and Comparative Examples A, B, C and D were applied to sheet metal (tin plate) by flood spinner in two coats and stoved at 188° C. for 190 seconds (to give a peak metal temperature of 188° C. for 60 seconds). Total dry film weight was approximately 8-10 microns.

They were then tested according to the following tests:

Joy Test

A coated, stoved panel was immersed in a 1% aqueous solution of washing up liquid at 85° C. for 30 minutes. After cross-hatching, the adhesion of the stoved film to the panel was assessed by tape removal according to ISO 2409.

Film Appearance

A coated, stoved panel was immersed in a solution of washing-up liquid and the appearance assessed.

Water Boil

A coated, stoved panel was immersed for 30 minutes in boiling water. After cross-hatching, the adhesion of the stoved film to the panel was assessed by tape removal according to ISO 2409.

Iron Content

Coated, stoved can bodies were filled with an aqueous solution comprising 1 part citric acid and 0.6 parts citrate buffer to 100 parts of de-ionised water. After closing and pressurisation to 30-35 psi, the cans were pasteurised for 30 minutes at 85° C. After cooling to 20-22° C., a controlled semi-spherical indentation was introduced into the can side wall by means of a pendulum. Cans were then stored at 50° C. for 14 days. Assessment was made of the degree of corrosion across the can body surface by utilising the grading described in ASTM D610; the iron content of the solution was estimated by atomic absorption spectroscopy and the area of corrosion on the reverse impact site and the damage to the coating in the neck region assessed by visual inspection.

Flexibility

A 10×4 cm tin plate panel was coated with the test coating and stoved according to the procedure described above. The panel was bent lengthways, with the coating facing outward around a cylindrical mandrel of 5 mm diameter forming a U shape. This was retained on a base plate, one end of which was higher than the other and a weight of 2.4 kg dropped on it from a height of 65 cm. This produced a panel with a varying radius of curvature along its length. The panel was then immersed in acidified copper sulphate solution for three minutes, after which time it was removed and rinsed with water. Copper is deposited where the coating has failed to the metal. The performance of the coating was estimated by measuring the length of unaffected coating, expressed as a percentage of the total length.

Table 1 is a summary of the test results

Comparative Examples B and C both produce hazy and rough coatings, indicating that the polymers in these dispersions are not compatible. This produces crosslinked (or stoved) coatings that are unusable. Comparative Example D, using polyester instead of PVB, shows unacceptably poor water resistance in the water boil test and is also assessed as poor in a taste test.

Surprisingly, Example 1 produces a clear and smooth coating having excellent water resistance, as demonstrated by the water boil and Joy test. The corrosion performance is also excellent as demonstrated by the very low level of iron detected in the electrolyte solution and the small area of corrosion.

Surprisingly we have demonstrated that by adding a preformed polymer, such as PVB, to the ingredients before polymerisation of the ethylenically unsaturated monomers (so that the addition polymer is formed in the presence of the preformed polymer) significantly improved properties result.

TABLE 1

| Example | Description | Film appearance | Joy test (rating) | Water boil (rating) | Iron content ppm | Area of corrosion square mm | Neck damage square mm |
| --- | --- | --- | --- | --- | --- | --- | --- |
| 1 | PVB added to diepoxy and both acrylated in situ | Clear, smooth and glossy | 0 | 1 | 1 | 0 | 0 |
| Comparative A | Diepoxide-addition polymer graft | Clear | 1 | 1 | 9 | 50 | 90 |
| Comparative B | PVB added to Comparative A | Hazy and rough | N/T | N/T | 12 | 50 | 95 |
| Comparative C | PVB-addition polymer graft added to Comparative A | Hazy and rough | 1 | 2 | N/T | N/T | N/T |
| Comparative D | Polyester added to diepoxy and both acrylated in situ | Clear | 0 | 3 Blush | N/T | N/T | N/T |

N/T means not tested as the stoved coating was hazy and rough and thus unusable for carbonated beverages
Ratings 0 to 5 = best to worst

FURTHER EXAMPLES

Examples 2 to 6 were made following the same procedure and ingredients as used in Example 1 other than the ratio of PVB:Epoxy was varied as indicated in Table 2.

The coatings of Examples 2 to 7 were applied to sheet metal (tin plate) by flood spinner in two coats and stoved at 188° C. for 190 seconds. Their flexibility and water boil rating was evaluated.

The compositions and performance is summarised in Table 2

TABLE 2

| | Molecular weight of PVB | Composition PVB:Epoxy:Acrylic:X-linker | Water boil rating | Flexibility (% pass) | Film appearance |
|---|---|---|---|---|---|
| 2 | 70,000-90,000 | 10:65:20:5 | 0 | 90 | Clear, smooth and glossy |
| 3 | 70,000-90,000 | 20:55:20:5 | 1 | 92 | Slightly hazy |
| 4 | 70,000-90,000 | 50:25:20:5 | 4 | 94 | Hazy |
| 5 | 70,000-90,000 | 75:0:20:5 | 5 | N/T | Did not form a film |
| 6 | 30,000-35,000 | 10:65:20:5 | 5 | 89 | Clear, smooth and glossy |
| 7 | 250,000-350,000 | 10:65:20:5 | 3 | 95 | Clear, smooth and glossy |

The data shows that the presence of the PVB polymer increases the flexibility of the coating. As the proportion of the PVB increases, the clarity of the film begins to deteriorate. Where clarity is important the PVB:Epoxy resin ratio should be less than approximately 2:1.

The effect of varying the average molecular weight of the PVB from 30,000-35,000 to 250,000-350000 Daltons was evaluated in examples 2, 6 and 7. The water boil rating of example 6 was poor demonstrating that the molecular weight of the PVB used should be greater than about 35,000 Daltons.

The invention claimed is:

1. A process for producing an aqueous dispersion comprising polymer particles, said polymer particles comprising a preformed diepoxy resin and at least one other preformed polymer excluding polyester, wherein both the preformed diepoxy resin and the at least one other preformed polymer excluding polyester are at least partially modified with a grafted addition polymer comprising a copolymerisable dispersing moiety, wherein the process comprises
   i) providing a solution of the preformed diepoxy resin and the at least one other preformed polymer excluding polyesters in an organic carrier liquid, wherein the at least one other preformed polymer excluding polyester is selected from polyvinyl acetals; polyvinyl chloride; ethylene and its copolymers; cellulose and its copolymers; butadiene-acrylonitrile; butadiene-styrene; polyisobutylene, styrene-isobutylene; siloxanes; polyamides; polyurethanes; and polyols;
   ii) combining the solution of i) with ethylenically unsaturated monomers, said monomers comprising an effective amount of a copolymerisable dispersing moiety;
   iii) providing an effective amount of a grafting polymerisation initiator;
   iv) allowing or causing the monomers to polymerise and graft to at least some of both the preformed polymers to form a solution of modified polymers;
   v) optionally adding a crosslinking agent to the solution of iv); and
   vi) dispersing the solution of modified polymers with or without the optional crosslinking agent in an aqueous medium to form a stable dispersion of particles, wherein the polymer particles do not contain any phosphate diepoxy resin.

2. A process according to claim 1 wherein the particles comprise a mixture of modified polymers and optionally crosslinking agent.

3. A process according to claim 2 wherein the crosslinking agent is added to solution iv) at a chosen temperature such that the crosslinking capability is substantially preserved.

4. A process according to claim 1, wherein the at least one other preformed polymer is a polyvinyl acetal.

5. A process according to claim 4 wherein the polyvinyl acetal is a polyvinyl butyral (PVB).

6. A process according to claim 5 wherein the weight average molecular weight of the poly vinyl butyral is greater than 35000 Daltons.

7. A process according to claim 5 wherein the PVB:diepoxy ratio by weight is from 6:94 to 30:70.

8. A process according to claim 1, wherein the dispersing moiety is ionic.

9. A process according to claim 8 wherein the dispersing moiety is anionic.

10. A process according to claim 9 wherein the anionic dispersing moiety is acrylic acid, methacrylic acid, or a combination thereof.

11. A process according to claim 8 wherein at least some of the dispersing moieties are neutralised with a neutralising agent.

12. A process according to claim 11 wherein the neutralising agent comprises dimethyl ethanolamine.

13. A process according to claim 1, wherein the grafting polymerisation initiator is a peroxide.

14. A process according to claim 13 wherein the grafting polymerisation initiator is benzoyl peroxide.

15. A process according to claim 13 wherein the initiator is used in an amount of from 1 to 10% based on the weight of monomers.

16. An aqueous dispersion comprising polymer particles, said polymer particles comprising a preformed diepoxy resin and at least one other preformed polymer excluding polyester, wherein
   both the preformed diepoxy resin and the at least one other preformed polymer excluding polyester are at least partially modified with grafted addition polymer comprising a copolymerisable dispersing moiety,
   wherein the at least one other preformed polymer excluding polyester is selected from polyvinyl acetals; polyvinyl chloride; ethylene and its copolymers; cellulose and its copolymers; butadiene-acrylonitrile; butadiene-styrene; polyisobutylene, styrene-isobutylene; siloxanes; polyamides; polyurethanes; and polyols, and wherein the polymer particles do not contain any phosphated diepoxy resin.

17. The aqueous dispersion according to claim 16 further comprising a crosslinking agent.

18. The aqueous dispersion according to claim 16 wherein the preformed diepoxy resin is derived from a bisphenol A diglycidyl ether.

19. The aqueous dispersion according to claim 16 wherein the at least one other preformed polymer excluding polyester is a polyacetal.

20. The aqueous dispersion according to claim 19 wherein the polyacetal is polyvinyl butyral (PVB).

21. The aqueous dispersion according to claim 20 wherein the weight average molecular weight of the polyvinyl butyral is greater than 35000 Daltons.

22. The aqueous dispersion according to claim 20 wherein the PVB:preformed diepoxy resin ratio by weight is from 6:94 to 30:70.

23. The aqueous dispersion according to claim 16 wherein the copolymerisable dispersing moiety is ionic.

24. The aqueous dispersion according to claim 23 wherein the copolymerisable dispersing moiety is anionic.

25. The aqueous dispersion according to claim 24 wherein the anionic copolymerisable dispersing moiety is acrylic acid and/or methacrylic acid.

26. The aqueous dispersion according to claim 24 wherein at least some of the copolymerisable dispersing moiety is neutralised with a neutralising agent.

27. The aqueous dispersion according to claim 26 wherein the neutralising agent comprises dimethyl ethanolamine.

28. An aqueous dispersion obtained by the process defined in claim 1.

29. A coating composition comprising the aqueous dispersion of claim 16.

30. The coating composition according to claim 29 wherein the composition contains a crosslinking agent.

31. The coating composition according to claim 30 wherein the crosslinking agent is selected from the group consisting of phenol-formaldehyde resins, melamine-formaldehyde resins and urea-formaldehyde resins.

32. A metal substrate coated with the coating composition according to claim 29.

33. A metal substrate coated with the coating composition according to claim 30, wherein the coating is crosslinked.

34. The coated metal substrate according to claim 32 wherein the metal substrate forms a container.

35. The process according to claim 1 wherein
the crosslinking agent is added to solution iv) at a chosen temperature such that the crosslinking capability is substantially preserved and at least one other preformed polymer is a polyvinyl acetal;
the polyvinyl acetal is a polyvinyl butyral, and the weight average molecular weight of the poly vinyl butyral is greater than 35000 Daltons;
the crosslinking agent is added to solution iv) at a chosen temperature such that the crosslinking capability is substantially preserved and at least one other preformed polymer is a polyvinyl acetal, and the dispersing moiety is ionic;
the polyvinyl acetal is a polyvinyl butyral, and the weight average molecule weight of the poly vinyl butyral is greater than 35000 Daltons, and wherein the dispensing moiety is ionic;
the ionic dispersing moiety is acrylic acid, methacrylic acid, or a combination thereof and at least some of the dispersing moieties are neutralised with a neutralising agent; or
the grafting polymerisation initiator is a is benzoyl peroxide used in an amount of from 1 to 10% based on the weight of monomers.

36. The aqueous dispersion according to claim 16, including at least one of:
a) wherein the preformed diepoxy resin is derived from a bisphenol A diglycidyl ether, and the at least one other preformed polymer excluding polyester is polyacetal;
b) wherein the preformed diepoxy resin is derived from a bisphenol A diglycidyl ether, and the at least one other preformed polymer excluding polyester is polyvinyl butyral, and with a weight average molecular weight of greater than 35000 Daltons;
c) wherein the preformed diepoxy resin is derived from a bisphenol A diglycidyl ether, and the at least one other preformed polymer excluding polyester is polyvinyl butyral, said polyvinyl butyral having a weight average molecular weight of greater than 35000 Daltons;
d) wherein the preformed diepoxy resin is derived from a bisphenol A diglycidyl ether, and the at least one other preformed polymer excluding polyester is polyvinyl butyral (PVB), said polyvinyl butyral having a weight average molecular weight of greater than 35000 Daltons, and the PVB:preformed diepoxy resin ratio by weight is from 6:94 to 30:70;
e) any one of (a) through (d) and wherein the copolymerisable dispersing moiety is ionic; and
f) wherein the coplymerisable dispersing moiety is ionic or anionic, or is acrylic acid and/or methacrylic acid and is neutralised with a neutralising agent.

37. An aqueous dispersion obtained by the process defined in claim 35.

38. A coating composition comprising the aqueous dispersion of claim 36.

39. The coating composition according to claim 38 wherein the composition contains a crosslinking agent.

40. A metal substrate coated with the coating composition according to claim 39.

41. The aqueous dispersion according to claim 16, comprising the preformed diepoxy resin and the preformed polymer excluding polyester is polyvinyl acetal polymer, where the diepoxy resin and the polyvinyl acetal polymer are at least partially modified with grafted addition polymer comprising from 5 to 75% by weight of copolymerisable dispersing moiety calculated on the weight of the grafted addition polymer.

* * * * *